April 30, 1963 V. L. NEWHOUSE 3,088,040

PLURAL CRYOGENIC SWITCHES CONTROLLED BY TWO VARYING OPPOSED MAGNETIC FIELDS PRODUCING NULL ALLOWING SELECTED SUPERCONDUCTIVITY

Filed Oct. 13, 1958 2 Sheets-Sheet 1

Inventor:
Vernon L. Newhouse,
by Richard R. Brainard
His Attorney.

April 30, 1963 V. L. NEWHOUSE 3,088,040

PLURAL CRYOGENIC SWITCHES CONTROLLED BY TWO VARYING OPPOSED MAGNETIC FIELDS PRODUCING NULL ALLOWING SELECTED SUPERCONDUCTIVITY

Filed Oct. 13, 1958 2 Sheets-Sheet 2

Inventor:
Vernon L. Newhouse,
by Richard R. Brainard
His Attorney.

United States Patent Office 3,088,040

Patented Apr. 30, 1963

3,088,040

PLURAL CRYOGENIC SWITCHES CONTROLLED BY TWO VARYING OPPOSED MAGNETIC FIELDS PRODUCING NULL ALLOWING SELECTED SUPERCONDUCTIVITY

Vernon L. Newhouse, Scotia, N.Y., assignor to General Electric Company, a corporation of New York Filed Oct. 13, 1958, Ser. No. 766,948
16 Claims. (Cl. 307—88.5)

The present invention relates to a superconductive switch in which the switching operation is performed by a controlled magnetic field.

At temperatures near absolute zero a substantial number of metallic elements and alloys have zero resistance (twenty-two metallic elements of this type are presently known). The resistance of any one of these superconductive materials can be restored by the application of a magnetic field greater in magnitude than a value termed the transition field, which varies with the materials and their temperatures as well as other factors. I utilize this resistance restoring phenomena in the switch of my invention.

Most switches have moving parts, the momentum of which prevents these switches from being quick acting. In many switches that are quick acting, the moving part is an electron beam which requires a vacuum-tight envelope.

Accordingly, an object of the present invention is to provide a quick acting switch not requiring a vacuum-tight enclosure.

A further object is to provide a switch having no moving parts.

Still another object is to provide a switch that is operated by a magnetic field.

These and other objects are obtained in one embodiment of my invention comprising an array of similar super-conductive elements connected in different load circuits, all of which are connected in parallel with a current source. A set of windings produces different magnetic fields at the elements, while another set of windings produce equal fields at the elements that are all in opposition to the first mentioned magnetic fields. By adjustment of these last mentioned fields, the superconductive elements are made selectively superconductive, so that the current is conducted to a preselected load.

The novel features believed characteristic of the invention are set forth in the appended claims. The invention itself, together with further objects and advantages thereof, may best be understood by reference to the following description taken in connection with the accompanying drawings, in which;

Figure 1:
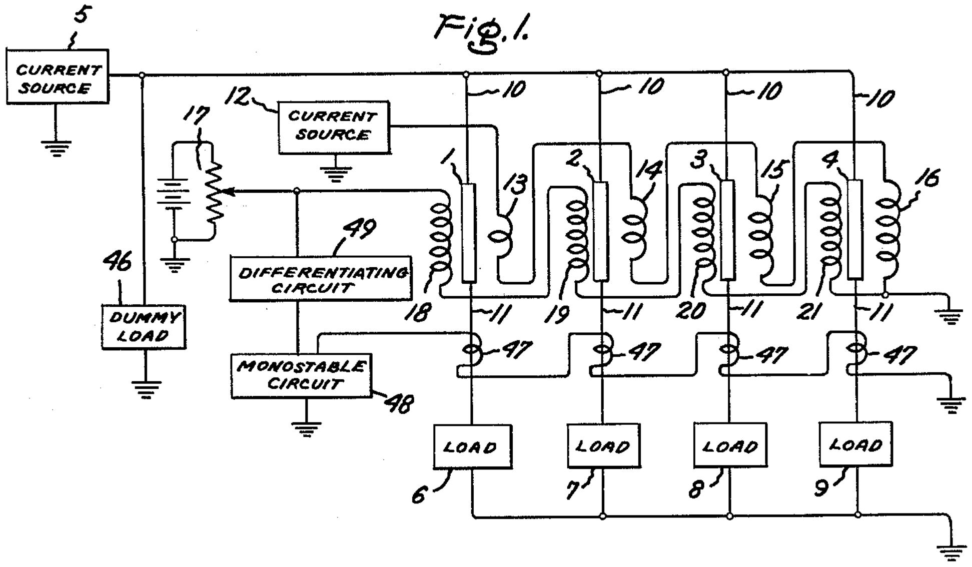
FIG. 1 is a circuit diagram of one embodiment of my invention.

In the FIG. 1 embodiment a plurality of superconductive elements 1, 2, 3, and 4 selectively control the current flow from an alternating or direct current source 5 to a plurality of loads 6, 7, 8, and 9. Although only four elements 1 through 4 and loads 6 through 9 are illustrated, any number may be utilized. For the control of current, elements 1 through 4, which preferably all have the same transition field, must have much greater resistances than the resistances of the loads 6 through 9. In some applications loads 6 through 9 may be coils of superconductive material which have inductance only.

Each of the elements 1 through 4 has two ends, one of which is connected by leads 10 to a terminal of current source 5 and the other of which is connected by leads 11 to a different load 6 through 9. The circuits to loads 6 through 9 are completed by a common ground connection with a terminal of current source 5.

Magnetic fields, which are preferably direct fields, are applied to elements 1 through 4 by current flow from a current source 12 through a first set of a plurality of windings 13, 14, 15, and 16 of different number turns. These magnetic fields should be greater in magnitude than the transition field of elements 1 through 4. Also, the difference in magnitudes of these fields at any two elements 1 through 4 should be greater than the transition field of these elements.

Magnetic fields are also supplied to elements 1 through 4 by current flow from an adjustable current source comprising a potentiometer arrangement 17, through another set of windings 18, 19, 20 and 21 all of which preferably have the same number of turns. These fields are in opposition to those produced by current flow through windings 13 through 16.

Means, not shown, maintain this switch at a temperature near absolute zero. One suitable arrangement, called a cryostat, includes liquid helium contained in a Dewar vessel which in turn is surrounded by liquid nitrogen contained in a larger Dewar vessel. Due to this low temperature environment, preferably all of the switch components are made superconducting to avoid joule heat generation.

Figure 2:
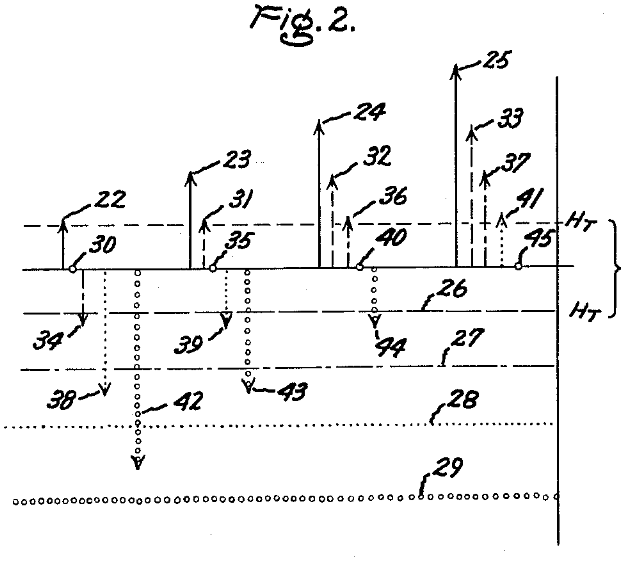
FIG. 2 is a graph illustrating the operation of the FIG. 1 embodiment.

The operation of the switch of FIG. 1 can best be understood by reference to the graph of FIG. 2 in which the positive and negative ordinate values correspond to magnetic fields in opposite directions in elements 1 through 4. Solid line arrows 22, 23, 24 and 25 correspond, respectively, to the magnetic fields produced by current flow through windings 13 through 16. Horizontal lines 26, 27, 28 and 29 correspond to four different fields produced when four different currents flow through windings 18 through 21. The arrows 30, 31, 32 and 33 represent the resultant magnetic fields at elements 1 through 4, respectively, when the magnetic field from each of the windings 18 through 21 is the value to which line 26 corresponds. Also, arrows 34, 35, 36 and 37; 38, 39, 40 and 41; and 42, 43, 44 and 45 are the resultant magnetic fields at the elements 1 through 4 for the fields indicated by lines 27, 28 and 29, respectively. The transition field, which may be either positive or negative, is indicated by $H_t$. The magnitude of the transition field is not a function of direction.

In the absence of current flow through windings 18 through 21, the magnetic fields from windings 13 through 16 maintain all of the superconductive elements 1 through 4 resistive. Then substantially all of the current from source 5 flows through a parallel connected relatively low resistance dummy load 46.

When the current from source 17 through windings 18 through 21 produces a magnetic field at each of the elements 1 through 4 of a magnitude indicated by line 26 in FIG. 2, the resultant magnetic field at only element 1 (arrow 30) is less than the transition field. Substantially all the current from source 5 then flows through the superconductive element 1 and through load 6 since the resistance in this load circuit is then much lower than the resistance of any of the load circuits, including the circuit of the dummy load 46.

If current is desired through load 7, the current from source 17 is increased to produce at elements 1 through 4 the magnetic field indicated by line 27. The resultant field (arrow 34) at element 1, which is increased by this change of field to greater than the transition field, restores the resistance of element 1. The resultant fields at the other elements 2 through 4 are decreased, but only at element 2 is the resultant field (arrow 35) decreased below the transistion field. With only element 2 superconductive, the current from source 5 switches from load 6 to load 7.

When the current through windings 15 through 21 produces the magnetic field indicated by the line 28, the resultant field at element 2 is increased above the transition field while at element 3 it is decreased below the transition field. At element 4 the resultant magnetic field is decreased, but not below the transition field. The resultant magnetic field at element 1 is increased even more beyond the transition field. Since only element 3 is superconductive, the current from source 5 switches to load 8.

It should be apparent that when the magnetic field produced at windings 18 through 21 is a value indicated by line 29, only element 4 is superconductive. Then the current from source 5 flows through load 9.

A switching operation between some loads may produce a short pulse of current through another load. For example, if the switching is between loads 6 and 8, the current from source 17 must, momentarily, be at values that produce current flow in load 7. The inductance of windings 18 through 21 prevents instantaneous changes of current from source 17.

This current flow through the intermediate load or loads can be obviated by means that insert resistance into the load circuits during switching operations. Due to this resistance, the current from source 5 will then flow through dummy load 46 during the switching operations.

In the switch of FIG. 1 this means comprises a plurality of windings 47, current flow through which produces magnetic fields that destroy the superconductivity of leads 11. If leads 11 are not superconductive, windings 47 may be placed around leads 10 or switching elements 1 through 4. A monostable circuit 48, when triggered, produces a current pulse through windings 47 at least equal in duration to the maximum time required for a switching operation. The triggering pulses are provided by a differentiating circuit 49 that differentiates the output voltage from source 17. Since the voltage from source 17 changes rapidly only during a switching operation, the differentiating circuit 49 produces trigger pulses only during these switching operations.

There are many modifications of my FIG. 1 switch embodiment, all of which are within the scope of my invention. For example, the current from source 17 may be maintained constant and the switching operations obtained by variations in the current of source 12. Also, windings 18 through 21 need not have the same number of turns nor elements 1 through 4 the same transition field. The permutations of the combinations of the materials for elements 1 through 4, turns for windings 13 through 16 and 18 through 21, and currents from sources 12 and 17 that produce operable switches are astronomical but they are apparent from the teachings of my inventions. Further, in many applications windings 47 and circuits 48 and 49 may be omitted.

Figures 3, 4:
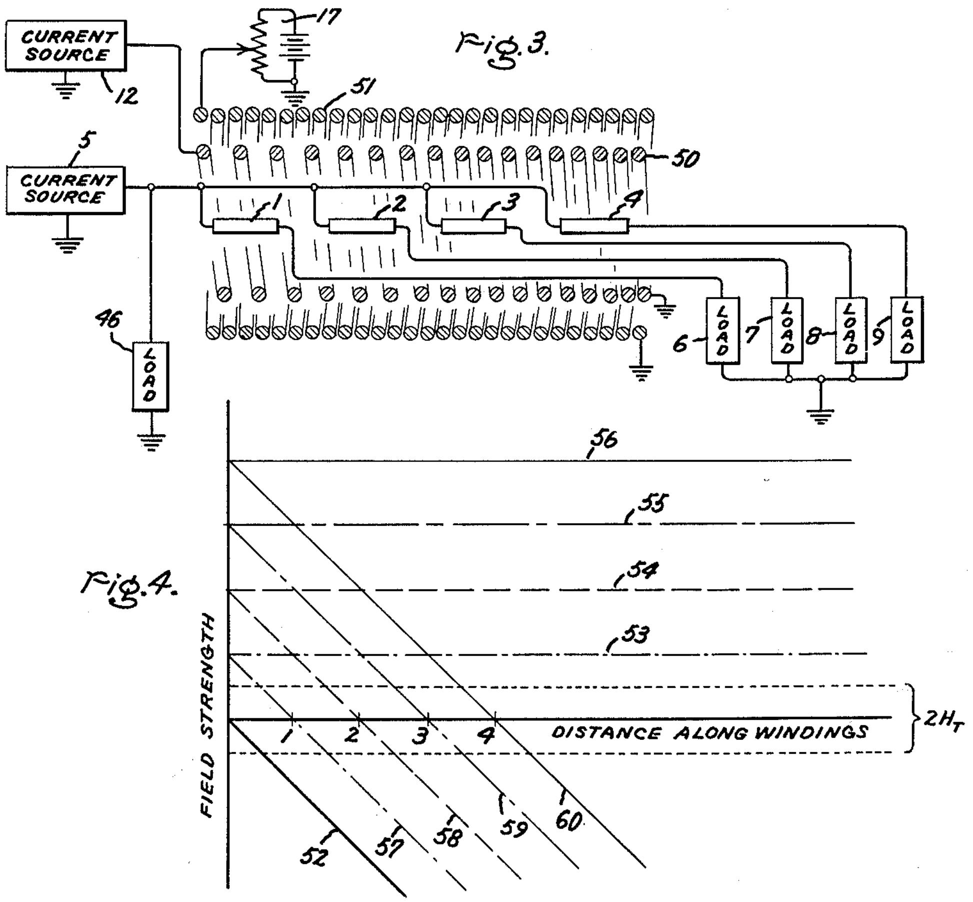
FIG. 3 is a circuit diagram of another embodiment of my invention.
FIG. 4 is a graph illustrating the operation of the FIG. 3 embodiment.

In my switch embodiment illustrated in FIG. 3, currents through a variable pitch winding 50 and a constant pitch winding 51 produce opposing magnetic fields at elements 1 through 4 positioned along the axis of windings 50 and 51. When the current through winding 51 is varied, the point of cancellation of the magnetic fields moves along this axis. Consequently, a resultant magnetic field less than the transition field can be selectively created at elements 1 through 4 to cause only one of these elements at a time to become superconductive. The operation of the FIG. 3 embodiment can be better understood by reference to the graph of FIG. 4 in which field strength is represented by units along the ordinate, and distances along the axis of windings 50 and 51 by units along the abscissa. A line 52 corresponds to the magnetic field produced by current flow through winding 50. Lines 53, 54, 55 and 56 correspond to magnetic fields produced by four different values of current flow through winding 51. And lines 57, 58, 59 and 60 correspond to the respective resultant fields. Numbers 1, 2, 3 and 4 along the abscissa indicate the positions of elements 1 through 4.

When there is no current flow through winding 51, the magnetic field (line 52) produced by current flow through winding 50 is greater than the transition field at all the elements 1 through 4. Then substantially, all the current from source 5 passes through dummy load 46.

When the magnetic field produced by current flow through winding 51 is a value to which line 53 corresponds, the resultant field (line 57) is zero at element 1. But it is greater than the transition field at all the other elements 2 through 4. Consequently, current from source 5 flows through load 6 only.

When the magnetic field from winding 51 increases to the magnitude to which line 54 corresponds, the resultant field (line 58) is less than the transition field near and at element 2 only. Then current flows through the superconductive element 2 to load 7. Similarly, elements 3 and 4 become superconductive, respectively, for the resultant magnetic fields to which lines 59 and 60 correspond.

If desired, means can be inserted in the FIG. 3 embodiment for preventing current flow to the loads during switching operations.

Figure 5:
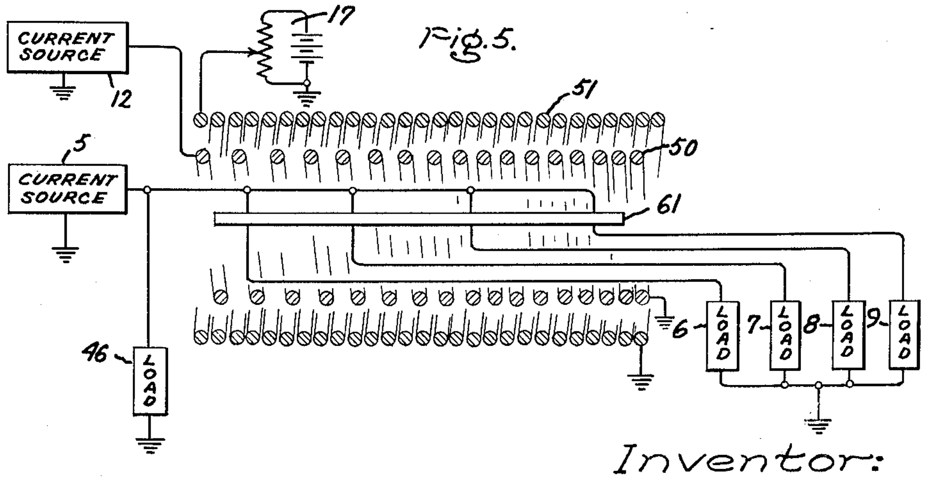
FIG. 5 is a circuit diagram of a third embodiment of my invention.

The switch illustrated in FIG. 5 is similar to the switch in FIG. 3 with the exception that the discrete elements 1 through 4 are replaced by a continuous superconductive sheet 61, the resistance of which isolates the various load circuits from one another. The spacings between adjacent leads at sheet 61 can be determined by the graph of FIG. 4 since the operations of the FIG. 3 and FIG. 5 embodiments are the same.

In summary, I have described a switch in which the switching operation is obtained by the destruction of superconductivity by a magnetic field. In all of the embodiments of my invention, two opposing magnetic fields, at least one of which is adjustable, produce a space varying magnetic field for performing the switching operation. Since there are no moving parts nor deflected beams, and the destruction of superconductivity is substantially instantaneous, my switch is quick acting and economical.

While the invention has been described with respect to certain specific embodiments, it will be appreciated that many modifications and changes may be made by those skilled in the art without departing from the spirit of my invention. I intend, therefore, by the appended claims, to cover all such modifications and changes as fall within the true spirit and scope of my invention.

What I claim as new and desire to secure by Letters Patent of the United States is:

1. A switch for selectively distributing current to a plurality of load circuits connected in parallel with a current source, comprising a plurality of discrete superconductive elements, each one for connection in a different one of said load circuits, and means for producing a space varying magnetic field having a null zone of least magnetic field strength for destroying the superconductivity of all but a preselected one of said discrete superconductive elements, said latter means comprising plural electromagnetic means each producing a field in the same area of a superconductive element enabling said element to be superconductive.

2. A circuit for selectively distributing current to a plurality of load circuits connected in parallel with a current source, comprising a common sheet of superconductive material connected in said load circuits such that the connections between said load circuits at said sheet are spaced, and means for producing a space varying magnetic field for destroying the superconductivity of said sheet of superconductive material except for a portion of said superconductive material in the circuit of a preselected load circuit, said latter means comprising plural magnetic means each producing a field in the same area of said sheet including said portion, empowering said portion of said superconductive material to be superconductive.

3. A circuit for selectively distributing current to a plurality of load circuits comprising a current source connected in parallel with said load circuits, superconductive material connected in series in each of said load circuits, and means including plural magnetic means each producing a field in the area of superconductive material connected with one of said load circuits, said plural magnetic means providing a resultant field permitting said superconductive material connected in said one of said load circuits to be superconductive while destroying the superconductivity in said material except for the said material connected in said one of said load circuits.

4. The circuit as defined in claim 3 wherein said superconductive material comprises a single sheet of superconductive material to which said load circuits are connected such that the connections between said load circuits and said sheet are spaced.

5. The circuit as defined in claim 3 wherein said superconductive material comprises a plurality of discrete superconductive elements, each one connected in a different one of said load circuits.

6. A circuit for selectively distributing current to a plurality of load circuits comprising a current source connected in parallel with said load circuits, superconductive material connected in series in each of said load circuits, means for producing a first magnetic field arrangement that is different in magnitude at the superconductive material in each of said load circuits by an amount as great as the transition field of said superconductive material and that at the superconductive material in each of said load circuits is as great as the transition field of said material, means for producing a second magnetic field arrangement of substantially equal magnitude fields at the superconductive material in each of said load circuits, the magnetic fields of said second magnetic field arrangement being opposed to the magnetic fields of said first magnetic field arrangement, each of the fields of said second magnetic field arrangement at the superconductive material in each of said load circuits being as great as the transition field of said superconductive material, and means for varying the magnitude of the field strength of one of said magnetic field arrangements.

7. A circuit for selectively distributing current to a plurality of load circuits comprising a current source connected in parallel with said load circuits, a plurality of discrete superconductive elements, each connected in a different one of said load circuits, means for producing a first magnetic field arrangement that at each of said plurality of discrete superconductive elements differ in magnitude by the transition field of said elements and that at each element is as great as the transition field, means for producing a second magnetic field arrangement of substantially equal magnitude fields at each of said superconductive elements, the magnetic fields of said second magnetic field arrangement being opposed to the magnetic fields of said first magnetic field arrangement, each of the fields of said second magnetic field arrangement being as great as the transition field of said superconductive elements, and means for varying the magnitude of the fields of one of said magnetic field arrangements.

8. A circuit for selectively distributing current to a plurality of load circuits comprising a current source connected in parallel with said load circuits, a sheet of superconductive material connected in said load circuits such that the connections of said load circuits to said sheet are spaced, means for producing a first magnetic field that is different in magnitude at the portion of the superconductive sheet in each of said load circuits by an amount as great as the transition field of said sheet, and that at all of the portions of the superconductive sheet in the load circuits is greater than the transition field, and means for producing a second magnetic field along said sheet of substantially constant magnitude and greater than the transition field, and means for varying the magnitude of one of said fields.

9. A cryogenic electronic device comprising current supporting means normally offering no resistance to the flow of electric current when refrigerated to a low temperature near absolute zero in the presence of less than the critical transitional magnetic field characteristic of said material, plural magnetic means each directing a magnetic field in the same area of a current supporting means for producing a space varying magnetic field in the vicinity of said current supporting means, said produced field having a null zone less than said transition field of said material, and means for altering said produced field for translating said null zone relative to said material such that only selected current supporting means in said null zone offers a zero resistance current-carrying path.

10. A switch for selectively distributing current to a plurality of load circuits comprising plural current supporting means, said means being formed of material having the characteristic of losing electrical resistance when refrigerated to a low temperature and regaining said resistance in the presence of a magnetic field greater than a critical transition field, plural magnetic means each directing a magnetic field in the same area of a current supporting means for producing a space varying magnetic field in the vicinity of said plural current supporting means, said space varying field having a null point less than the transition field of said material and generally elsewhere having a field strength greater than said transition field, and means for translating said null point among said plural means so that said plural means remain resistive to the flow of current except for selected current supporting means to which said null point is translated for substantial coincidence therewith.

11. A cryogenic electronic device comprising means for supporting supercurrents composed of material offering no resistance to the flow of current when refrigerated to a low temperature and having a characteristic of regaining said resistance in the presence of a magnetic field greater than a critical transition field; means for producing a space varying magnetic field ranging from a relatively high intensity greater than said transition field in a first directional sense, through a null zone wherein said field is less than said transition field, to a range wherein said field is greater in intensity than said transition field in a second directional sense; and means altering the intensity associated with said produced field in response to a desired current flow direction to translate said null zone with respect to said means for supporting the current so that a zero resistance current-carrying path is determined by said null zone.

12. A switch for selectively distributing current to the plurality of load circuits connected in parallel with a current source, comprising a plurality of discrete superconductive elements, each one for connection in a different one of said load circuits, means for producing a space varying magnetic field having a null zone of least magnetic field strength for destroying the superconductivity of all but a preselected one of said discrete superconductive elements, and a dummy load circuit connected in parallel with said current source, said dummy load circuit having a resistance much lower than the resistance of any one of said load circuits when said superconductive elements are resistive and much higher than the resistance of any load circuit in which the superconductive element has zero resistance.

13. A switch for selectively distributing current to a plurality of load circuits connected in parallel with a current source, comprising a plurality of discrete superconductive elements, each one for connection in a different one of said load circuits, and means for producing a space varying magnetic field having a null zone of least magnetic field strength for destroying the superconductivity of all but a preselected one of said discrete superconductive elements, said last mentioned means comprising a plurality of windings with two different windings adjacent each of said elements, and means for conducting currents through said windings for producing opposed magnetic fields at each of said elements.

14. A switch for selectively distributing current to a plurality of load circuits connected in parallel with a current source, comprising a plurality of discrete superconductive elements, each one for connection in a different one of said load circuits, and means for producing a space varying magnetic field having a null zone of least magnetic field strength for destroying the superconductivity of all but a preselected one of said discrete superconductive elements, said last mentioned means comprising two windings wound around said elements, one of said windings having a constant pitch and the other of said windings having a varying pitch, and means for energizing said windings with currents to produce opposed magnetic fields at each of said elements.

15. A circuit for selectively distributing current to a plurality of load circuits connected in parallel with a current source, comprising a common sheet of superconductive material connected in said load circuits such that the connections between said load circuits at said sheet are spaced, means for producing a space varying magnetic field for destroying the superconductivity of said sheet of superconductive material except for a portion of said superconductive material in the circuit of a preselected load circuit, and a dummy load circuit connected in parallel with said load source, said dummy load circuit having a resistance that is much lower than the resistance of any one of said load circuits when the superconductive material portion is resistive and that is much higher than the resistance of any load circuit in which the superconductive material portion in that load circuit has zero resistance.

16. A circuit for selectively distributing current to a plurality of load circuits connected in parallel with a current source, comprising a common sheet of superconductive material connected in said load circuits such that the connections between said load circuits at said sheet are spaced, and means for producing a space varying magnetic field for destroying the superconductivity of said sheet of superconductive material except for a portion of said superconductive material in the circuit of a preselected load circuit, said means for producing a space varying magnetic field comprising two windings wound around said sheet of superconductive material, one of said windings having a constant pitch and the other of said windings having a varying pitch, and means for energizing said windings with currents such that opposing magnetic fields are produced.

References Cited in the file of this patent

UNITED STATES PATENTS

| | | |
|---|---|---|
| 916,541 | Eastham | Mar. 30, 1909 |
| 2,696,347 | Lo | Dec. 7, 1954 |
| 2,914,736 | Young | Nov. 24, 1959 |

FOREIGN PATENTS

| | | |
|---|---|---|
| 464,064 | Canada | Mar. 28, 1950 |

OTHER REFERENCES

"The Cryotron—a Superconductive Computer Component," by D. A. Buck, Proceedings of the IRE, April 1956.

"A Review of Superconductive Switching Circuits," by Glade et al., National Electronics Conference, vol. XIII, October 7–9, 1957.